Nov. 8, 1966 H. FROITZHEIM 3,283,692
VENTILATING ARRANGEMENT FOR VEHICLES
Filed Sept. 8, 1964 3 Sheets-Sheet 1

INVENTOR.
HANS FROITZHEIM
BY Dicke & Craig
ATTORNEYS

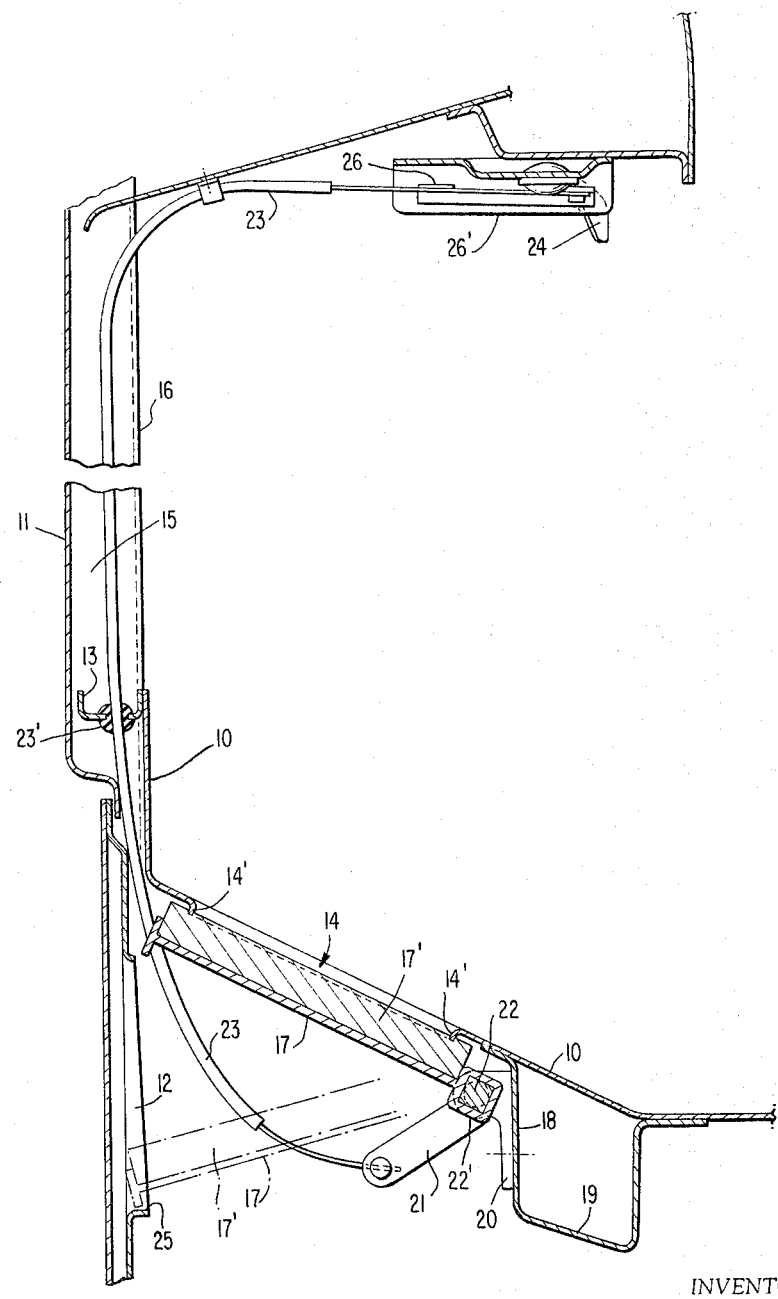

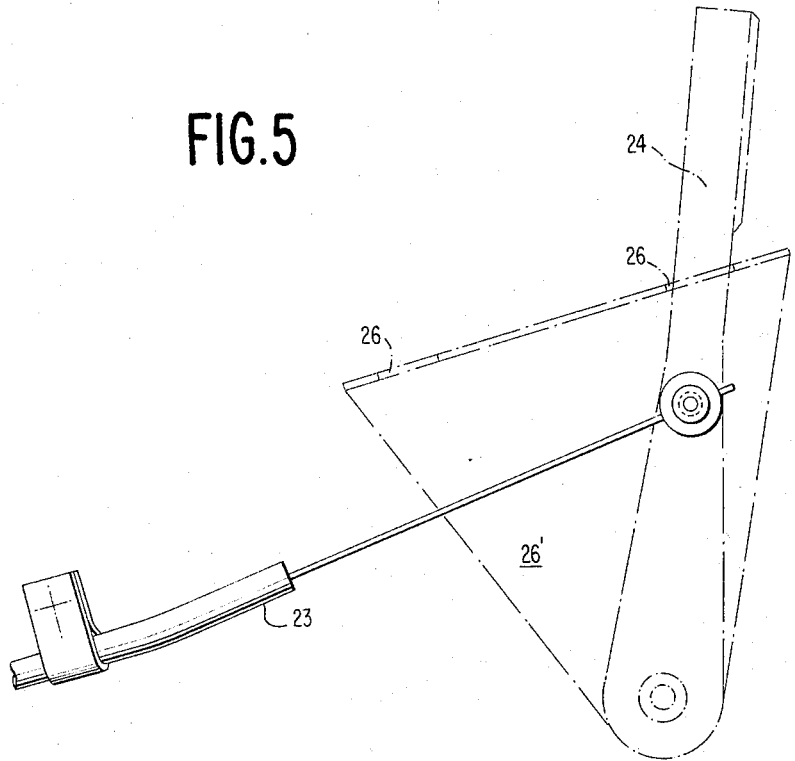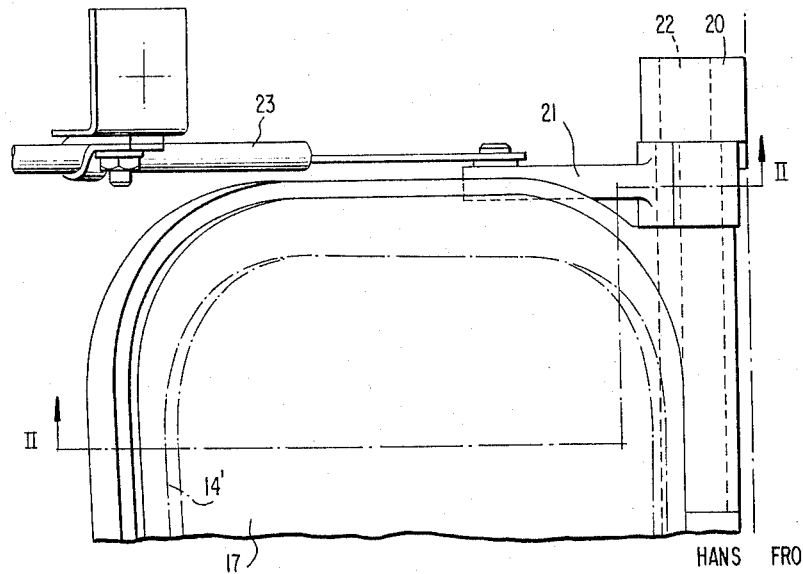

United States Patent Office 3,283,692
Patented Nov. 8, 1966

3,283,692
VENTILATING ARRANGEMENT FOR VEHICLES
Hans Froitzheim, Sindelfingen, Germany, assignor to Daimler-Benz Aktiengesellschaft, Stuttgart-Unterturkheim, Germany
Filed Sept. 8, 1964, Ser. No. 394,675
Claims priority, application Germany, Sept. 11, 1963, D 42,453
10 Claims. (Cl. 98—2)

The present invention relates in general to vehicle ventilation, and more particularly, to an arrangement for permitting the introduction of fresh air into the front driver compartment of a vehicle for ventilating the driver's cab, especially for commercial vehicles with separate cabs or those with short hoods.

The invention is specially provided to supply fresh air to the foot portion of the interior compartment in addition to and as a necessary supplement to the ventilation provided by means of the conventional air intake through the side windows or the normally provided air vents arranged in and about the height of the median line of the inner wall of the vehicle interior compartment.

Harmful effects are created during hot weather at vehicle rest or even during driving because of accumulation or reflection of heat in the driver's compartment even for vehicles equipped with modern ventilating devices; thereby, the comfort and safety of driving is extensively impaired. In spite of all conventional ventilating devices, the increased heat accumulation in the vehicle interior as a result, on the one hand, of the heat transfer from the motor and especially also from the outside air, and on the other hand, due to the extensive use of curved glass in the windshield of the vehicle, which greatly increases the heat in the driver's compartment through magnification of the sun's rays, producing high temperatures therein. By such means, the stagnant air in the usually non-ventilated foot room is intolerably heated.

In order to remedy this condition, it is suggested according to the invention that the floor board be provided with openings in the form of elongated rectangles which may be closed from below by means of fresh air flaps pivotably arranged at one edge of the openings and manipulated from the dashboard or other convenient location within the vehicle passenger compartment and which openings are covered on top by means of a grid or the like.

The flow of air provided by conventional ventilating means, such as side windows and vents in the side walls of the driver compartment, provide in the case of the former little or no circulation in the lower foot portion of the passenger compartment, and in the case of the latter only a transverse circulation, which is not only hindered by the seats and other objects, but contributes little to circulation in other portions of the compartment. It is therefore necessary to at least supplement the normally provided ventilation with a source of outside air which is directed longitudinally of the driver compartment and derived adjacent the extreme end thereof in the floor in front of the driver and/or passenger.

It is therefore an object of the instant invention to provide a ventilating arrangement for the lower foot portion of the driver compartment which will provide an air circulation in the longitudinal direction thereof.

It is another object of the invention to provide an air intake vent in the floor of the vehicle interior compartment in front of the driver, which vent may be selectively closed from below in an air-tight manner from within said compartment.

It is a further object of the instant invention to provide in a simple and economic manner a necessary supplement to the conventional ventilation means in a motor vehicle so as to increase the movement of air in the foot space of the passenger or driver compartment.

A still further object of the invention resides in the provision of air intake vents in the pedal board of a vehicle passenger compartment and a grid mounted over these vents on the inside thereof to maintain the strength of the pedal board and provide continuous support across the surface thereof in spite of the apertures therein.

A further object of the present invention resides in the provision of selectively closable air intake vents in the pedal board of the vehicle having a single closure member through which at least one pedal lever extends and means for sealing said closure member around said pedal lever to provide an air-tight closure at all times during movement of said pedal.

These and further objects, features and advantages of the present invention will become more obvious from the following description when taken in connection with the accompanying drawings which show, for purposes of illustration only, one embodiment in accordance with the present invention, and wherein:

FIGURE 2 shows a side sectional view of the pedal board taken along line II—II of FIGURE 3;

FIGURE 3 is a top plan view of a portion of the fresh air flap and associated operating lever in accordance with the invention;

FIGURE 5 is a detail view of the control lever arrangement provided for actuation of the fresh air flap shown in FIGURES 2 and 3.

Figure 1:
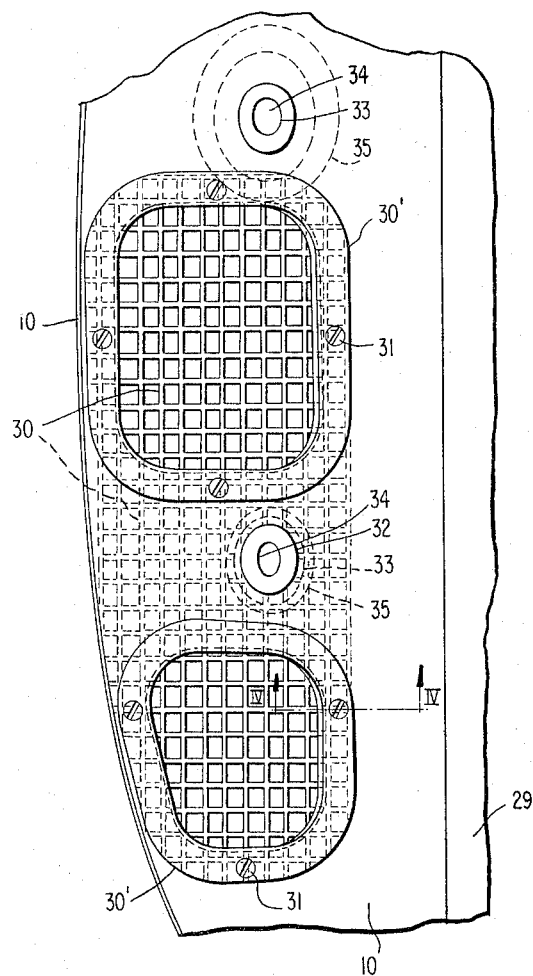
FIGURE 1 is a top plan view of the floor or pedal board including the ventilation means in accordance with one embodiment of the invention.

Referring now to the drawings wherein like reference numerals are used throughout the various views to designate corresponding parts, and particularly to FIGURES 1 and 2, the floor or pedal board 10 in the driver's compartment of a commercial vehicle with front steering is inclined upwardly until it reaches the front wall 11 at about the upper edge of the usual inlet opening 12 for the air which is exhausted laterally through a vent (not shown) in the side wall of the compartment. At its upper end it is again bent upwardly providing support for an inner wall member 16 and a U-shaped channel member 13 (FIGURE 2).

In order to supply sufficient fresh air to the driver when the outside temperature is high and particularly when the vehicle is parked, an opening 14 is provided in accordance with the invention in the pedal or floor board 10. The opening 14 may have the shape of an elongated rectangle which is cut transversely into the floor board 10 and preferably is arranged on the passenger's side as well as on the side of the driver. By providing transverse openings in the pedal board 10, air enters the passenger compartment beneath the foot space and is initially directed longitudinally of the vehicle so that it not only moves the normally stagnant air in foot space, but greatly adds to the general circulation of air in compartment by providing a longitudinal flow therein.

The opening 14 may be covered by a flap or lid 17 pivotably secured to an outer leg 18 of a hat-shaped, transversely extending support member 19 by means of a bearing block 20. The flap 17 is formed by a double-T profile provided on one side thereof with square hinge eyelets 22' and overhangs the opening 14 on all sides thereof. The flap 17 is provided on its upper side with a soft spring gasket plate 17', which, in its operative position, is tightly pressed against the downwardly extending edges 14' of the opening 14 so that the edges are pressed into the gasket plate, providing an air-tight seal.

A lever 21 for pivoting the flap 17 is fastened on one end thereof, as seen in FIGURES 2 and 3, to a rotating shaft 22 keyed to the flap 17 by means of the square eyelets 22'. The flap 17 is operated by means of a flexible drive rod 23 connected to one end of lever 21, the other end of the rod 23 being attached to a control or positioning lever 24, which is mounted at the underside of the dashboard and is pivotable between two stop positions 26 (FIGURE 5) on a bracket 26' mounted under the dashboard or any other convenient location. By shifting the positioning lever 24 next to the driver or next to the passenger from the rest position within the detent 26 and by rotating the positioning lever 24, the cable or flexible rod 23 is moved downwardly and the flap 17 is thereby opened. The flexible drive rod is guided by clamps at the dashboard and a rubber ring at the U-shaped member 13 in the frame 15 extending transversely between the outer skin 11 and the inner sheet 16 of the front wall. As shown in phantom-line in FIGURE 2, in the lower or open position, the flap 17 rests on a stop 25 at the grill frame of the inlet opening 12.

Figure 4:
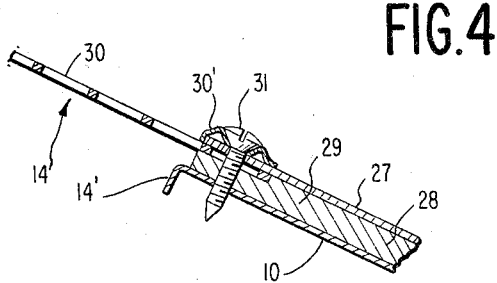
FIGURE 4 is a section taken along line IV—IV of FIGURE 5.

In order to prevent undue forces on the flap 17 by unintentional movement thereagainst or resting of the foot thereon, a grid plate 30 is inserted between the two flooring portions 10 and 27 at the periphery of the openings 14 (FIGURE 4) which plate is held in place by a frame 30' provided in the usual manner with a protecting overlay 29 consisting of a rubber mat 27 and a barrier layer 28. The overlay 29 and the grid plate 30 are fastened by means of screws 31 to the floor board 10. The grid plate 30 and also the frame 30' extend outside the edge 14' of the opening in order to prevent loosening of the grid 30 by the usual pressure against the floor.

It is particularly appropriate at the driver's side not to make the opening 14 continuous. In view of the pedal or other operating linkage members, it is often advantageous to provide two smaller openings next to each other instead of one long opening so that the floor board between them remains unaltered. However, it is desirable in providing simple regulation of the vent openings to utilize a unitary flap for both openings.

Where the pedal lever extends through the grid plate 30, it is necessary to provide ample openings 32 in the grid plate 30, the projective layer 29 and the flap 17 at the point of penetration thereof in order to provide for the rotating motion of the foot pedal. Where the pedal lever extends through the flap 17, it is advantageous to insert at the point of penetration between the rubber mat 27 and the barrier layer 28 a sealing disk 33 (FIGURE 1) of somewhat harder, resilient synthetic material into a depression 35 in the barrier layer 28 or between the barrier layer 28 and the floor board 10 whereby the hole 34 in the disk pivots along the circumference of the lever so that the disk 33 is always tightly mounted on the lever providing a good seal therebetween. The depression 35 in the barrier layer which may be above or below should be sufficiently wide to accommodate the movement of the sealing disk 33.

The inventive inlet device for the supply of additional fresh air to the foot space of a vehicle is, of course, also suitable for others other than the illustrated commercial vehicles, for example, also for rail motor cars and the like. When operating pedals are used only on one side of the driver's cabin, the pedal floor on this side may be made with plural openings whereas the other side may be made with one continuous opening.

While I have shown and described one embodiment in accordance with the present invention, it is obvious that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A ventilating arrangement for motor vehicles, especially commercial vehicles having the driver's compartment over the front axle, including a pedal board arranged transversely of the driver's compartment for accomodating the operating pedals of the vehicle, comprising a transversely disposed rectangular opening in said pedal board, closure means disposed below said pedal board for providing an air-tight seal for said opening, means for selectively adjustably operating said closure means from within the driver's compartment, and grid means disposed within said opening so as to maintain an effectively uninterrupted surface in said pedal board, said opening being provided with downwardly extending rim means cooperating with said closure means to effect said air-tight seal, said closure means including a resilient covering layer into which said rim means is embedded in the closed position of said closure means, said pedal board being composed of at least two separate layers and said grid means being supported between said separate layers.

2. A ventilating arrangement for motor vehicles, especially commercial vehicles having the driver's compartment over the front axle, including a pedal board arranged transversely of the driver's compartment for accommodating the operating pedals of the vehicle, comprising a transversely disposed rectangular opening in said pedal board, closure means disposed below said pedal board for providing an air-tight seal for said opening, means for selectively adjustably operating said closure means from within the driver's compartment, and grid means disposed within said opening so as to maintain an effectively uninterrupted surface in said pedal board, said pedal board being composed of at least two separate layers and said grid means being supported between said separate layers.

3. A ventilating arrangement for motor vehicles, especially commercial vehicles having the driver's compartment over the front axle, including a pedal board arranged transversely of the driver's compartment for accommodating the operating pedals of the vehicle, comprising a transversely disposed rectangular opening in said pedal board, closure means disposed below said pedal board for providing an air-tight seal for said opening, means for selectively adjustably operating said closure means from within the driver's compartment, and grid means disposed within said opening so as to maintain an effectively uninterrupted surface in said pedal board, said opening being provided with downwardly extending rim means cooperating with said closure means to effect said air-tight seal, said closure means including a resilient covering layer into which said rim means is embedded in the closed position of said closure means, said pedal board being composed of at least two separate layers and said grid means being supported between said separate layers, said separate layers of said pedal board and said grid means being provided with at least one aperture for accommodating and operating pedal of the vehicle, and sealing means disposed about the periphery of said aperture between said pedal board and said closure means.

4. A ventilating arrangement for motor vehicles, especially commercial vehicles having the driver's compartment over the front axle, including a pedal board arranged transversely of the driver's compartment for accommodating the operating pedals of the vehicle, comprising a plurality of openings in said pedal board in a substantially rectangular pattern encompassing at least one of said operating pedals, a fresh air flap pivotally secured below said pedal board and communicating in the closed position with all of said openings to provide an air-tight seal thereof, operating means for remotely selectively adjusting said flap between said air-tight sealed position and a fully open position, and grid means disposed within said openings so as to maintain an effectively uninterrupted surface in said pedal board without hindering the flow of air through said openings.

5. A ventilating arrangement for motor vehicles, especially commercial vehicles having the driver's compartment over the front axle, including a pedal board arranged transversely of the driver's compartment for accommodating the operating pedals of the vehicle, comprising a plurality of openings in said pedal board in a substantially rectangular pattern encompassing at least one of said operating pedals, a fresh air flap pivotally secured below said pedal board and communicating in the closed position with all of said openings to provide an air-tight seal thereof, operating means for remotely selectively adjusting said flap between said air-tight sealed position and a fully open position, and grid means disposed within said openings so as to maintain an effectively uninterrupted surface in said pedal board without hindering the flow of air through said openings.

said fresh air flap being provided with a resilient covering layer on the side thereof adjacent said opening, and downwardly extending rim means encompassing said openings and cooperating with said resilient covering layer to provide said air-tight seal in the closed position of said fresh air flap.

6. A ventilating arrangement for motor vehicles, especially commercial vehicles having the driver's compartment over the front axle, including a pedal board arranged transversely of the driver's compartment for accommodating the operating pedals of the vehicle, comprising a plurality of openings in said pedal board in a substantially rectangular pattern encompassing at least one of said operating pedals, a fresh air flap pivotally secured below said pedal board and communicating in the closed position with all of said openings to provide an air-tight seal thereof, operating means for remotely selectively adjusting said flap between said air-tight sealed position and a fully open position, and grid means disposed within said openings so as to maintain an effectively uninterrupted surface in said pedal board without hindering the flow of air through said openings, said fresh air flap being provided with a resilient covering layer on the side thereof adjacent said opening, and downwardly extending rim means encompassing said openings and cooperating with said resilient covering layer to provide said air-tight seal in the closed position of said fresh air flap, said pedal board consisting of a double layer construction including a covering layer comprising an outer layer and a barrier layer, said grid means being disposed between said outer layer and said barrier layer over the entire area of said rectangular pattern.

7. A ventilating arrangement for motor vehicles, especially commercial vehicles having the driver's compartment over the front axle, including a pedal board arranged transversely of the driver's compartment for accommodating the operating pedals of the vehicle, comprising a plurality of openings in said pedal board in a substantially rectangular pattern encompassing at least one of said operating pedals, a fresh air flap pivotally secured below said pedal board and communicating in the closed position with all of said openings to provide an air-tight seal thereof, operating means for remotely selectively adjusting said flap between said air-tight sealed position and a fully open position, and grid means disposed within said openings so as to maintain an effectively uninterrupted surface in said pedal board without hindering the flow of air through said openings, said pedal board consisting of a double layer construction including a covering layer comprising an outer layer and a barrier layer, said grid means being disposed between said outer layer and said barrier layer over the entire area of said rectangular pattern.

8. A ventilating arrangement for motor vehicles, especially commercial vehicles having the driver's compartment over the front axle, including a pedal board arranged transversely of the driver's compartment for accommodating the operating pedals of the vehicle, comprising a plurality of openings in said pedal board in a substantially rectangular pattern encompassing at least one of said operating pedals, a fresh air flap pivotally secured below said pedal board and communicating in the closed position with all of said openings to provide an air-tight seal thereof, operating means for remotely selectively adjusting said flap between said air-tight sealed position and a fully open position, and grid means disposed within said openings so as to maintain an effectively uninterrupted surface in said pedal board without hindering the flow of air through said openings, said fresh air flap being provided with a resilient covering layer on the side thereof adjacent said opening, and downwardly extending rim means encompassing said openings and cooperating with said resilient covering layer to provide said air-tight seal in the closed position of said fresh air flap, said pedal board consisting of a double layer construction including a covering layer comprising an outer layer and a barrier layer, said grid means being disposed between said outer layer and said barrier layer over the entire area of said rectangular pattern, said pedal board and said grid means being provided with aligned apertures for said operating pedal within said rectangular pattern, said barrier layer being provided with a depression surrounding said aperture in said pedal board, and sealing means accommodated by said depression for sealing said aperture.

9. A ventilating arrangement for motor vehicles, including a pedal board for accommodating the operating pedals of the vehicle, comprising a rectangular opening in said pedal board, closure means disposed below said pedal board for providing an air-tight seal for said opening, means for operating said closure means from within the driver's compartment, and grid means disposed within said opening so as to maintain an effectively uninterrupted surface in said pedal board, said pedal board, said grid means, and said closure means being provided with at least one aperture for accommodating an operating pedal of the vehicle, and sealing means disposed about the periphery of said aperture between said pedal board and said closure means.

10. A ventilating arrangement for motor vehicles, especially commercial vehicles having the driver's compartment over the front axle, including a pedal board for accommodating the operating pedals of the vehicle, comprising a plurality of openings in said pedal board in a substantially rectangular pattern encompassing at least one of said operating pedals, closure means disposed below said pedal board so as to communicate with all of said openings in the closed position to provide an air-tight seal thereof, means for selectively operating said closure means from within the driver's compartment, and grid means disposed within said openings so as to maintain an effectively uninterrupted surface in said pedal board, said pedal board, said grid means, and said closure means being provided with aligned apertures for accommodating an operating pedal of the vehicle and sealing means disposed about the periphery of said aperture between said pedal board and said closure means.

References Cited by the Examiner
UNITED STATES PATENTS

| 1,387,131 | 8/1921 | Dean | 98—2 X |
| 1,491,744 | 4/1924 | Denny | 98—2 X |
| 1,689,489 | 10/1928 | Janecek | 98—2 |
| 1,759,001 | 5/1930 | Cherry | 98—2 |
| 1,885,668 | 11/1932 | Diaz | 98—2 |
| 3,103,867 | 9/1963 | Hierta | 98—2 |

MEYER PERLIN, *Primary Examiner.*